United States Patent
Lee

(10) Patent No.: US 8,250,403 B2
(45) Date of Patent: Aug. 21, 2012

(54) SOLID STATE DISK DEVICE AND RELATED DATA STORING AND READING METHODS

(75) Inventor: Doogie Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 32 days.

(21) Appl. No.: 12/714,799

(22) Filed: Mar. 1, 2010

(65) Prior Publication Data
US 2010/0229032 A1 Sep. 9, 2010

(30) Foreign Application Priority Data
Mar. 6, 2009 (KR) .................. 10-2009-0019265

(51) Int. Cl.
*G06F 11/00* (2006.01)
(52) U.S. Cl. ........ 714/6.22; 714/6.1; 714/6.2; 714/6.21; 714/6.24; 714/52
(58) Field of Classification Search .............. 714/6.1, 714/6.11, 6.2, 6.22, 6.24, 43, 52; 711/103, 711/114
See application file for complete search history.

(56) References Cited

U.S. PATENT DOCUMENTS

| | | | |
|---|---|---|---|
| 6,385,093 B1 | 5/2002 | Bautista, Jr. et al. | |
| 2009/0077305 A1* | 3/2009 | Shin et al. | 711/103 |
| 2009/0248964 A1* | 10/2009 | Yano et al. | 711/103 |
| 2010/0017650 A1* | 1/2010 | Chin et al. | 714/6 |
| 2010/0125695 A1* | 5/2010 | Wu et al. | 711/103 |
| 2010/0250848 A1* | 9/2010 | Kim | 711/114 |
| 2010/0268985 A1* | 10/2010 | Larsen et al. | 714/6 |
| 2011/0029716 A1* | 2/2011 | Moshayedi | 714/6 |

FOREIGN PATENT DOCUMENTS

| | | |
|---|---|---|
| KR | 100280451 B1 | 11/2000 |
| KR | 1020070085561 A | 8/2007 |

* cited by examiner

*Primary Examiner* — Joseph D. Manoskey
(74) *Attorney, Agent, or Firm* — Volentine & Whitt, PLLC

(57) ABSTRACT

A solid state disk device comprises a plurality of nonvolatile memories and a controller. The plurality of nonvolatile memories are electrically connected to a plurality of channels, respectively. The controller controls storing, erasing and reading operations of the nonvolatile memories. The controller divides input data into a number of units corresponding to a number of the plurality of channels and stores the divided input data in the nonvolatile memories through the plurality of channels.

20 Claims, 8 Drawing Sheets

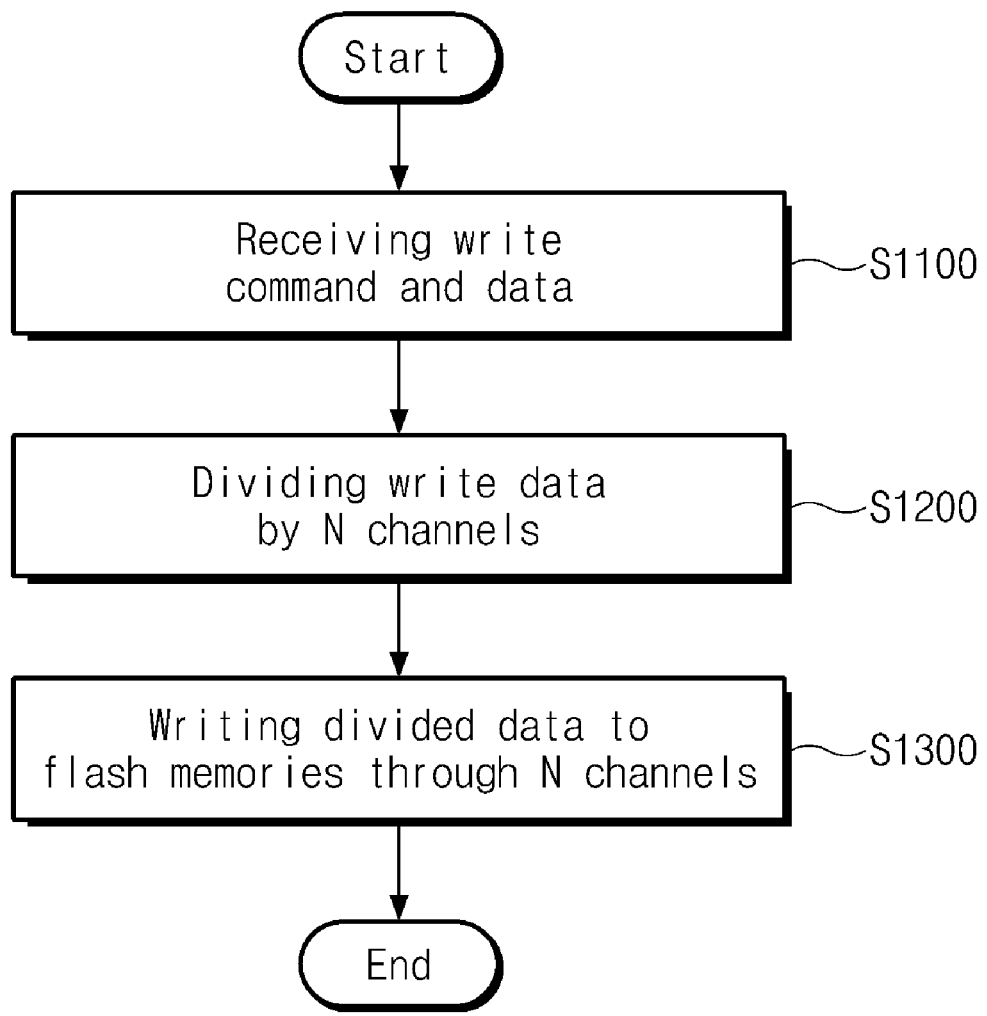

SOLID STATE DISK DEVICE AND RELATED DATA STORING AND READING METHODS

STATEMENT OF RELATED APPLICATIONS

This application claims priority under 35 U.S.C. §119 to Korean Patent Application No. 10-2009-0019265 filed on Mar. 6, 2009, the disclosure of which is hereby incorporated by reference in its entirety.

BACKGROUND

The inventive concept relates generally to electronic storage devices, and more particularly, to solid state disk devices and related methods of storing and reading data.

The demand for electronic storage media continues to grow each year, especially in light of the increasing adoption of personal computing and communication devices. To address this increasing demand, researchers have developed numerous types of data storage devices, each providing advantages and/or drawbacks compared with the others.

Hard disk drives (HDDs), for instance, tend to have relatively high storage density, high data transmission speed, fast data access time, and low cost. But they also tend to suffer from mechanical defects and high power consumption on account of their numerous moving parts.

Due to these and other shortcomings of HDDs, there is an ongoing trend to replace HDDs with solid state disk devices (SSDs) incorporating nonvolatile memories such as flash memories. These SSDs generally have fewer moving parts than HDDs, and therefore they tend to have fewer mechanical defects and lower power consumption. In addition, the reduction of moving parts can reduce latency and mechanical drive time compared with HDDs, allowing SSDs in some instances to execute read and write operations more quickly than HDDs. Moreover, SSDs can also reduce errors caused by latency and mechanical friction, improving reliability of read and write operations. Finally, SSDs tend to produce less heat and noise than HDDs and are largely resistant to external impacts, making them attractive for portable devices.

SUMMARY

Embodiments of the inventive concept provide a solid state disk device and methods of reading and storing data in the solid state disk device. Some of the embodiments improve data transmission efficiency and simplify the circuitry used in the solid state disk device.

According to one embodiment of the inventive concept, a solid state disk device comprises N nonvolatile memories electrically connected to N channels, respectively, where N is a number greater than one, and a controller. The controller controls storing, erasing and reading operations of the N nonvolatile memories. The controller receives a unit of input data and divides the input data into N data sub-units and stores the N data sub-units in the N nonvolatile memories, respectively, via the corresponding N channels.

In certain embodiments, the controller comprises an error correction engine that generates parity information corresponding to the unit of input data, and a direct memory access control unit that divides the input data into the N sub-units, divides the parity information into N parity sub-units, and transmits the N parity sub-units to the N channels, respectively, via the N channels.

In certain embodiments, the error correction engine is shared by the N channels.

In certain embodiments, the error correction engine generates the parity information before the controller divides the input data into the N data sub-units.

In certain embodiments, the DMA control unit comprises a data division unit that divides the input data and the parity information into the N data sub-units and "N" parity sub-units.

In certain embodiments, the DMA control unit simultaneously transmits the N data sub-units and N parity sub-units to the N nonvolatile memories via the N channels such that the data sub-units and parity sub-units do not pass through a bus of a central processing unit.

In certain embodiments, the unit of input data comprises a page of input data.

In certain embodiments, the DMA controller comprises a demultiplexer that performs data division operations.

In certain embodiments, the nonvolatile memories comprise flash memories.

In certain embodiments, the solid state disk device further comprises a flash translation layer that maintains a mapping between physical addresses of data stored in the flash memories and logical addresses of the data stored in the flash memories.

According to another embodiment of the inventive concept, a method of storing data in a solid state disk device is provided. The method comprises receiving a store command and a unit of input data from a host; generating parity information for the unit of input data, dividing the input data into N data sub-units and the parity information into N parity sub-units, wherein N is a number greater than one; and storing the N data sub-units and the N parity sub-units in a plurality of nonvolatile memories by transmitting the N data sub-units and N parity sub-units via N corresponding channels connected to the plurality of nonvolatile memories.

In certain embodiments, the parity information is generated by an error correction engine shared by at least two of the channels.

In certain embodiments, the nonvolatile memories comprise multi-bit flash memories.

In certain embodiments, the data sub-units and parity sub-units are simultaneously transmitted to the nonvolatile memories via the channels such that the data sub-units and parity sub-units do not pass through a bus of a central processing unit.

In certain embodiments, the input data and the parity information is divided by a demultiplexing operation.

According to another embodiment of the inventive concept, a method of reading data in a solid state disk device is provided. A read command is received from a host. In response to the read command, reading is performed to retrieve a plurality of data sub-units and a plurality of corresponding parity sub-units stored in a plurality of nonvolatile memory devices via a plurality of channels, wherein the number of the plurality data sub-units and the number of the plurality of parity sub-units equals the number of channels. Parity information is then generated from the plurality of data sub-units, the generated parity information is compared with the plurality of parity sub-units to determine whether the data sub-units contain any errors. Then, any errors detected in the data sub-units by the comparison are corrected the resulting corrected data is output.

In certain embodiments, the generating, comparing, and correcting are performed by an error correction engine shared by two or more channels.

In certain embodiments, the nonvolatile memory devices comprise multi-bit flash memory devices.

In certain embodiments, the method further comprises assembling the plurality of data sub-units into a page of data prior to outputting the corrected data.

In certain embodiments, the method further comprises prior to outputting the corrected data, mapping logical addresses of the corrected data to physical addresses of the corrected data.

BRIEF DESCRIPTION OF THE DRAWINGS

Embodiments will be more clearly understood from the following detailed description taken in conjunction with the accompanying drawings.

FIG. 6 is a flowchart illustrating a data storing method for a solid state disk device according to an embodiment of the inventive concept;

DETAILED DESCRIPTION OF THE EMBODIMENTS

Various embodiments will be described more fully hereinafter with reference to the accompanying drawings. The inventive concept may, however, be embodied in many different forms and should not be construed as being limited to only the illustrated embodiments. Rather, these embodiments are presented as teaching examples.

In selected embodiments, a solid state disk device receives data in page units (or sector units) generates error correction code (ECC) parity information for the unit of data. The device divides the data and the ECC information into sub-units simultaneously stores the respective sub-units in a plurality of memories via a corresponding plurality of channels. The solid state disk device generates ECC parity information using one ECC engine shared by the plurality of channels. Accordingly, the solid state disk device can distribute and store data through the plurality of channels without independently including an additional circuit such as the ECC engine for each of the channels. Accordingly, the circuit configuration of the device may be simplified and data transmission efficiency through the plurality of channels may be improved.

Figure 1:
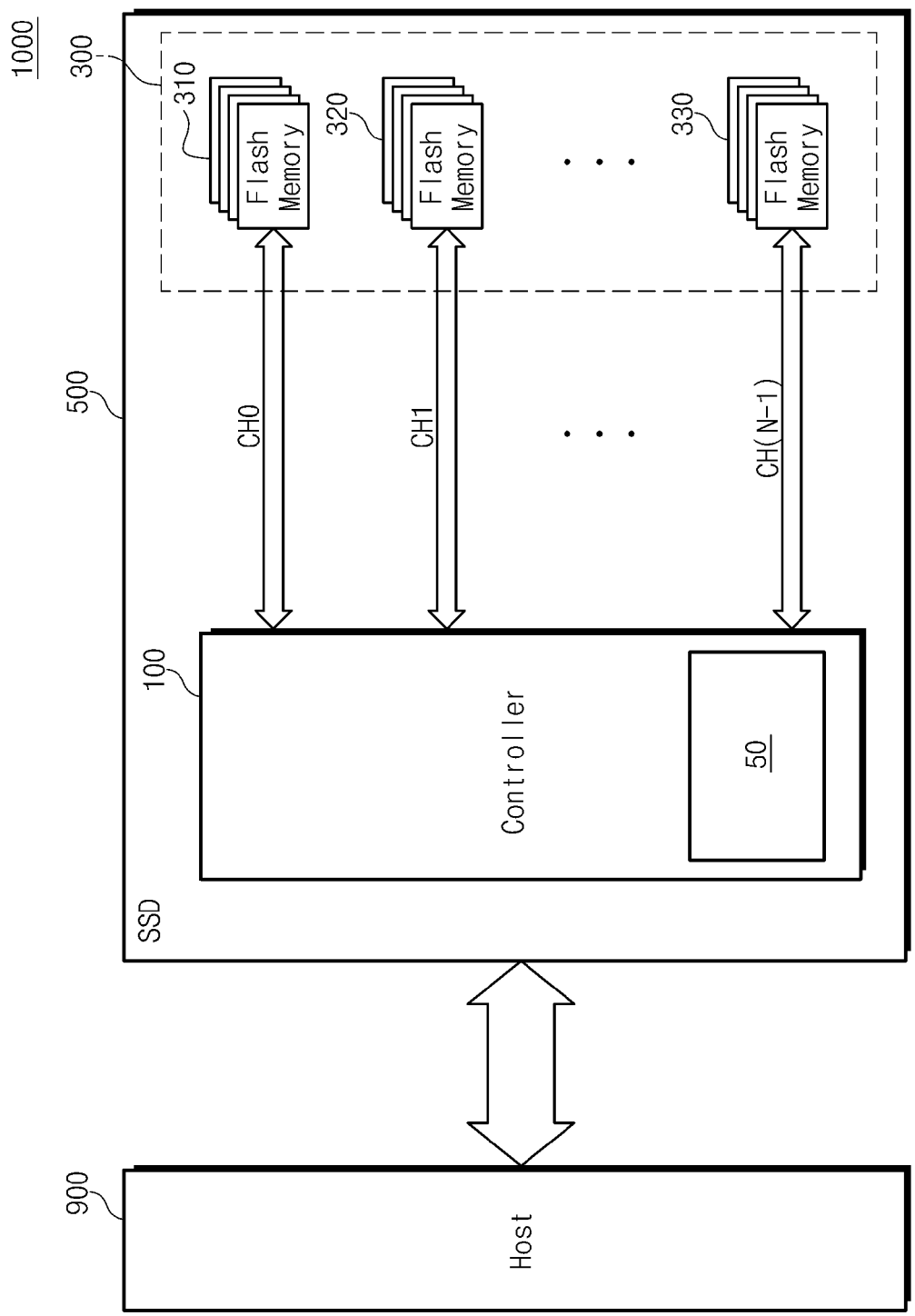
FIG. 1 is a block diagram illustrating a solid state disk system according to an embodiment of the inventive concept.

FIG. 1 is a block diagram illustrating a solid state disk system 1000 comprising an SSD 500 and a host 900 according to an embodiment of the inventive concept.

Referring to FIG. 1, SSD 500 comprises a controller 100 and a data storage unit 300. Data storage unit 300 stores data using semiconductor memory chips instead of an HDD platter. For instance, in some embodiments, data storage unit 300 comprises a nonvolatile memory such as flash memory.

Data is transferred between data storage unit 300 and controller 100 via a plurality of channels CH0 through CH(N-1). Within data storage unit 300, a plurality of flash memories 310 through 330 are electrically connected to channels CH0 through CH(N-1), respectively. Flash memories 310 through 330 may be configured independent of each other, and they may operate independent of each other. In particular, flash memories connected to different channels may operate independent of each other.

Channels CH0 through CH(N-1) represent distinct pathways or services for transmitting information such as commands and data to and from flash memories 310 through 330. A "way" is a set of multiple flash memories connected to a single channel. Thus, data may be transmitted via a single channel from controller 100 to a way comprising multiple flash memories. In some embodiments, a flash memory chip may correspond to a single way and a single channel. From the point of view of host 900, a flash memory chip corresponding to a way and a channel may be addressed by a single logical block address (LBA) that is transferred to controller 100.

Although selected embodiments are described using the example of a flash memory, data storage unit 300 could also, or alternatively, comprise other forms of memory. For example, data storage unit 300 could comprise a nonvolatile memory such as magnetoresistive random access memory (MRAM) or phase-change random access memory (PRAM). In addition, data storage unit 300 may comprise a volatile memory such as dynamic random access memory (DRAM) or static random access memory (SRAM).

Data storage unit 310 through 330 comprise flash or other types of memories capable of storing one or more bits of information per cell. As examples, they may comprise single-level flash memories capable of storing one bit per cell or multi-level flash memories capable of storing multiple bits per cell. Flash memories 310 through 330 may also comprise memories in which some cells are single-level flash memory cells and some cells are multi-level flash memory cells. Additionally, the cells may in flash memories 310 through 330 may be configured in any of several different forms, such as a NAND flash memory configuration or a NOR flash memory configuration. Further, flash memories 310 through 330 may be provided in a One-NAND flash memory configuration in which a flash memory core and a memory control logic are configured with a single chip.

Additionally, in flash memories 310 through 330, the structure of the charge trapping layers of memory cells may be configured in various forms. For example, the charge trapping layers of a memory cells may be configured with multi-crystal silicon having conductivity, or may be configured with a dielectric layer such as $Si_3N_4$, $Al_2O_3$, HfAlO or HfSiO. A flash memory structure using a dielectric layer such as $Si_3N_4$, $Al_2O_3$, HfAlO and HfSiO as a charge trapping layer may be referred to as a charge trap flash (CTF) memory.

Controller 100 may exchange data with host 900 through one or more of various interfaces such as Universal Serial Bus (USB), Multi Media Card (MMC), PCIExpress (PCI-E), AT Attachment (ATA), Serial AT Attachment (SATA), Parallel AT Attachment (PATA), Small Computer System Interface (SCSI), Serial Attached SCSI (SAS), Enhanced Small Disk Interface (ESDI) and Integrated Drive Electronics (IDE). The controller-side interface between controller 100 and host 900 may be implemented as a host interface 130 illustrated in FIG. 2.

Controller 100 controls storing, erasing and reading operations of data storage unit 300 in response to commands received from host 900. In the storing operations, controller 100 receives main data in page units (or sector units), together with ECC parity information corresponding to the main data. Controller 100 divides the main data and the ECC data into a "N" units (denoted "sub-data") corresponding to channels CH0 through CH(N-1). Controller 100 causes the sub-data to be stored in flash memories 310 through 330 via channels CH0 through CH(N-1). Controller 100 may manage the logical and physical addresses of the data received from host 900 either before or after division using an address mapping function of a Flash Translation Layer (FTL).

Controller 100 generates ECC parity information through a single ECC engine shared by channels CH0-CH(N-1). Accordingly, controller 100 distributes and stores data through the channels without including independent circuits such as ECC engines for each of the channels. By omitting such additional circuitry from SSD 500, its configuration is simplified and data transmission efficiency through the channels may be improved.

Figure 2:
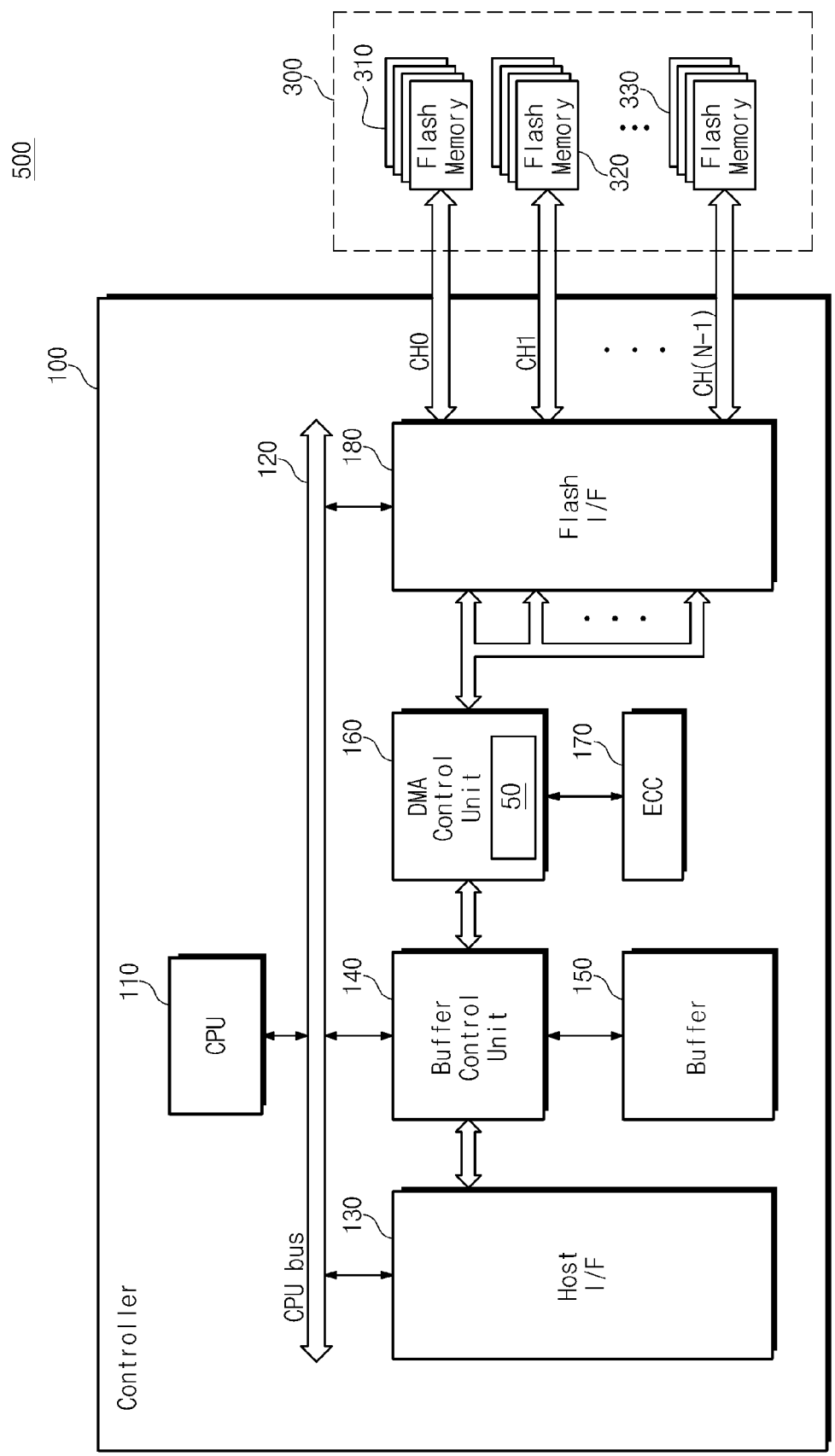
FIG. 2 is a block diagram illustrating the detailed configuration of a controller in FIG. 1.

FIG. 2 illustrates an embodiment of controller 100 comprising a single direct memory access (DMA) control unit 160 and one ECC engine 170. In alternative embodiments, controller 100 could comprise different numbers of DMA control units and ECC engines. In alternative embodiments, the controller 100 may divide the main data into N of sub-data, and the single ECC engine may generate N of sub-ECC data corresponding to N of sub-data after diving the main data by the controller 100. According to one embodiment of the inventive concept, the ECC engine may generate the ECC data (or N of sub-ECC data) before or after dividing the main data. Controller 100 further comprises a central processing unit (CPU) 110, a CPU bus 120, a host interface 130, a buffer memory control unit 140, a buffer memory 150 and a flash interface 180. CPU 110, host interface 130, buffer memory control unit 140, buffer memory 150 and flash interface 180 are connected through CPU bus 120.

DMA control unit 160 comprises a data division unit 50 for dividing main data from host 900 and corresponding ECC parity information. Data division unit 50 may divide a page unit of main data provided from buffer memory 150 through buffer memory control unit 140, and ECC parity information corresponding to the main data. For example, data division unit 50 may divide the output of ECC engine 170 (e.g., data derived from page units (or sector units) received from host 900) by the number of channels (e.g., "N" channels).

The data to be divided by data division unit 50 may have sizes other than a page or sector. For instance, it may comprise two or more pages or less than one page. Moreover, data division unit 50 may be located in a location other than within DMA control unit 160, e.g., in a flash interface. The configuration and operation of data division unit 50 is described herein with reference to FIGS. 2 through 5.

Data stored in memory cells of flash memories 310 through 330 must be erased before the memory cells can be overwritten. In flash memory, however, the unit of stored data may differ from that of deleted data. For instance, data is erased in blocks that are larger than the units (e.g., pages) in which data is stored.

To conceal a delete operation of the flash memory, the FTL is used between a file system (not shown—the file system is commonly stored in software within a host) and flash memories 310 through 330. In a storing operation for flash memories 310 through 330, the FTL maps an LBA generated by the file system into a Physical Block Addresses (PBA) of flash memories 310 through 330 in which a deleting operation has been performed. This is called an address mapping function. By the address mapping function of the FTL, host 900 may recognize and interface with SSD 500 as if it had a configuration or operation similar to an HDD, SRAM or DRAM. Additionally, the address mapping function of the FTL may comprise address mapping functions for a plurality of sub-data that are divided. An address mapping result for the divided sub-data may be stored in a metadata type. In addition, the FTL may manage bad blocks and data retention for unexpected events such as power loss or trauma.

CPU 110 controls the overall operation of SSD 500. Host interface 130 exchanges a command, an address and data with host 900 under the control of CPU 110. Flash interface 180 exchanges data with flash memories 310 through 330 via channels CH0 through CH(N-1) under the control of CPU 110. Flash interface 180 may support at least one of a NAND flash memory, a NOR flash memory and a One-NAND flash memory. Flash memories 310 through 330 may be electrically connected to respective channels CH0 through CH(N-1). Multiple memories of the same type may be connected to one channel, and memories of different types may be connected to different channels. Furthermore, flash interface 180 may selectively perform software and hardware interleaving operations through channels CH0 through CH(N-1).

Buffer memory control unit 140 controls access operations of buffer memory 150, such as reading, storing or erasing operations, under the control of CPU 110. Buffer memory 150 may be implemented as a volatile memory (e.g., SRAM or DRAM). Buffer memory 150 temporarily stores data transferred between flash memories 310 through 330 and host 900, and may store software necessary for the FTL function and programs to be operated by CPU 110. The software necessary performing the FTL function may be stored, for instance, in flash memories 310 through 330 or a corresponding data storage region, such as a boot code region. Then, in a power-up operation, the software may be loaded in buffer memory 150. Buffer memory 150 may further store information that is processed by the FTL, such as address mapping information for flash memories.

Data received from host 900 via host interface 130 is temporarily stored in buffer memory 150 via buffer memory control unit 140 under the control of CPU 110. Data stored in buffer memory 150 may be provided to flash memories 310 through 330 via buffer memory control unit 140 and flash interface 180 under the control of CPU 110. On the other hand, data received from flash memories 310 through 330 via flash interface 180 is temporarily stored in buffer memory 150 via buffer memory control unit 140 under the control of CPU 110. Data stored in buffer memory 150 may be provided to host 900 via buffer memory control unit 140 and host interface 130 under the control of CPU 110.

DMA control unit 160 and ECC engine 170 may be connected between buffer memory control unit 140 and flash interface 180. DMA control unit 160 performs controlling for buffer memory 150 and flash memories 310 through 330 to directly transmit data without passing through CPU bus 120. This is called a DMA operation.

In the DMA operation, data that are inputted/outputted through flash interface 180 may be directly transmitted between buffer memory 150 and flash memories 310 through 330 through DMA control unit 160 without passing through CPU bus 120. For example, data received from flash memories 310 through 330 via flash interface 180 may be temporarily stored in buffer memory 150 via DMA control unit 160 and buffer control unit 140 without passing through CPU bus 120, in the DMA operation. Likewise, data provided from host 900 and temporarily stored in buffer memory 150 may be provided to flash memories 310 through 330 that are respectively connected to channels CH0 through CH(N-1) through buffer control unit 140, DMA control unit 160 and flash interface 180 without passing through CPU bus 120. Since the DMA operation transmits data directly between buffer memory 150 and flash memories 310 through 330 without passing through CPU bus 120, the data transmission speed is independent of the limitations of CPU bus 120.

Although not shown in FIG. 2, a First-In, First-Out (FIFO) memory may be connected to DMA control unit 160. The FIFO memory may temporarily store data transmitted between buffer control unit 140 and DMA control unit 160 and data that transmitted between DMA control unit 160 and flash interface 180.

ECC engine 170 is connected to DMA control unit 160 and generates ECC parity information per page or sector unit by using data (e.g., main data or normal data) transmitted between buffer memory 150 and flash memories 310 through 330. The ECC parity information is generated by ECC engine 170 each time data is stored to prevent the data from being lost if bit errors occur in a flash memory, e.g., due to physical faults such as bad sectors.

ECC parity information generated by ECC engine 170 and corresponding data (e.g., main data or normal data) are transmitted between buffer memory 150 and flash memories 310 through 330. The transmitted data is divided into a plurality of sub-data by data division unit 50 within DMA control unit 160. The plurality of divided sub-data is distributed to and stored in respective flash memories 310 through 330 by DMA control unit 160, flash interface 180, and a plurality of channels. The plurality of divided main data may be stored in main regions of the respective flash memories 310 through 330. Furthermore, the plurality of divided ECC parity information may be stored in spare regions of the respective flash memories 310 through 330.

Where data is read from flash memories 310 through 330, errors may be detected using the divided ECC parity information corresponding to the read data. Based on the detection, the erroneous data may be corrected. An error detecting and correcting operation for the read data is performed by ECC engine 170, which is shared by channels CH0-CH(N-1).

As described above, SSD 500 divides main data transmitted between buffer memory 150 and flash memories 310 through 330 and ECC parity information generated in ECC engine 170 by a number of channels (e.g., "N" channels). SSD 500 stores the divided data in a plurality of flash memories connected to the channels. The ECC parity information distributed to and stored in the flash memories is used to detect and correct errors in data read from the flash memories. Thus, error detection and correction can be implemented with a single ECC engine 170 shared by a plurality of channels, and therefore SSD 500 need not incorporate an additional circuit such as ECC engine 170 for each of the plurality of channels. Accordingly, circuit configuration may be simplified, and data transmission performance may be improved through a plurality of channels.

Additional embodiments are presented below where controller 100 of SSD 500 comprises one DMA control unit 160 and one ECC engine 170. These embodiments are merely teaching examples and the number of DMA control units and ECC engines in controller 100 may be variously changed.

Figure 3:
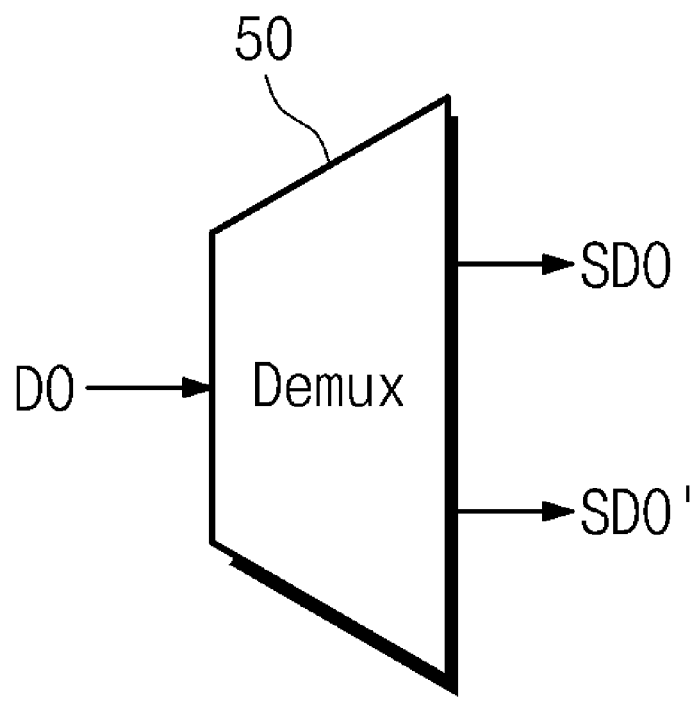
FIGS. 3 and 4 are diagrams illustrating the configuration and operation of a data division unit in FIG. 2.
Figure 4:
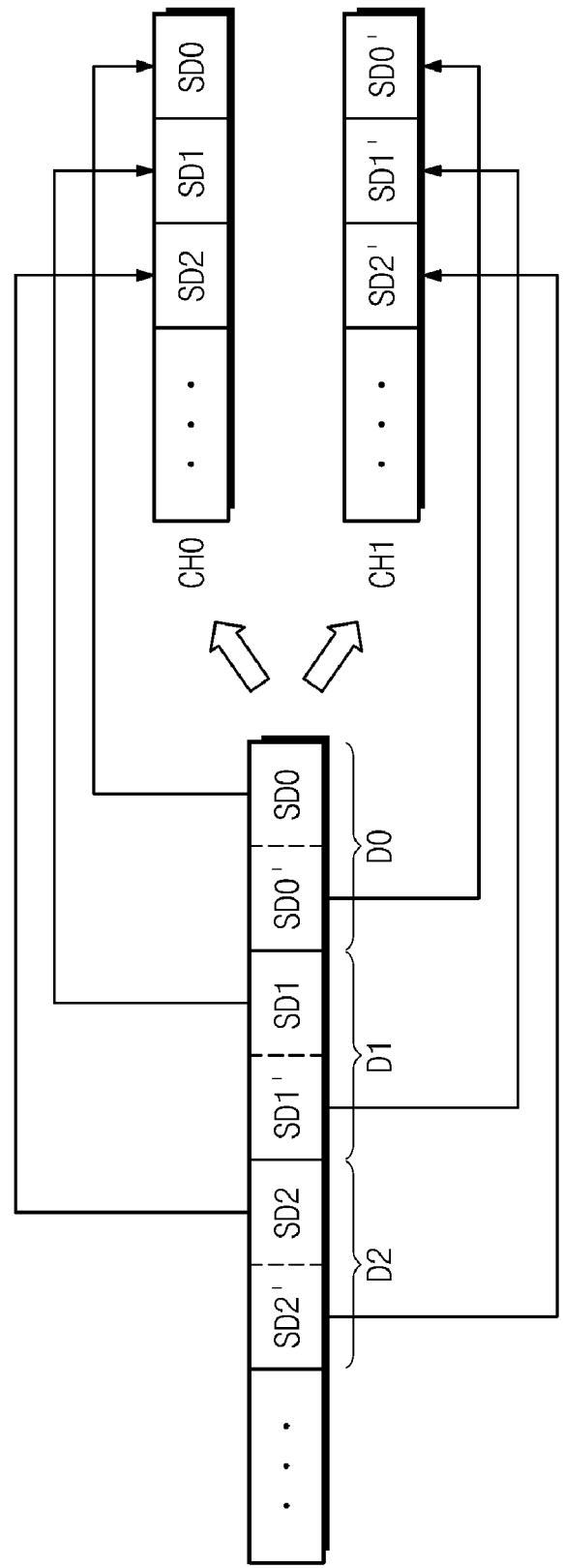

FIGS. 3 and 4 are diagrams illustrating the configuration and operation of data division unit 50. Data division unit 50 is located in DMA control unit 160 and divides data transmitted in page units through DMA control unit 160 into a number of units corresponding to a number of data channels. In the example of FIG. 3, data division unit 50 is implemented as a demultiplexer.

Where the main data of one page comprises 1024 bytes, for instance, and a SSD 500 comprises two channels, data division unit 50 divides the 1024-byte data into two units of 512 byte sub-data. Similarly, where SSD 500 comprises "N" channels, data division unit 50 divides 1024-byte main data into "N" units of sub-data having a size of 1024/N bytes, where "N" is an integer of two or more. FIGS. 3 and 4 show examples where N=2, so there are two channels CH0 and CH1.

ECC parity information generated by ECC engine 170 may also be divided by the number of channels by data division unit 50. For example, where ECC engine 170 generates 20-byte ECC parity information for a page of data, the ECC parity information may be divided into two units of sub-parity information, where each unit has 10-bytes. As the number of channels in SSD 500 increases, the size of the divided sub parity information decreases.

Data produced by division operations of data division unit 50 is referred to as sub-data. In one example, data division unit 50 divides page or sector data D0, D1 and D2 into sub data SD0, SD0', SD1, SD1', SD2 and SD2', where sub-data SD0 and SD0' each comprise sub-data from page or sector data D0 and corresponding sub-data from the parity information, sub-data SD1 and SDP each comprise sub-data from page or sector data D1 and corresponding sub-data from the parity information, and so on. FIG. 3 illustrates the division of data D0 into sub-data SD0 and SD0'. Sub-data SD0 is assigned to one channel CH0 and sub-data SD0' is assigned to the other channel CH1. SD1, SD1', SD2 and SD2' similarly correspond to page or sector data D1 and D2. Sub-data SD0, SD0', SD1, SD1', SD2 and SD2' is simultaneously provided to a plurality of channels without passing through CPU bus 120 under the control of DMA control unit 160.

FIG. 4 illustrates divided sub-data SD0, SD0', SD1, SD1', SD2 and SD2' being transmitted in channels CH0 and CH1. Because page data (or sector data) D0, D1 and D2 is automatically divided into multiple channels, a change in channel operation mode of a DMA is not required. Accordingly, firmware and hardware structures for implementing multi-channel access may be simplified.

Figure 5A:
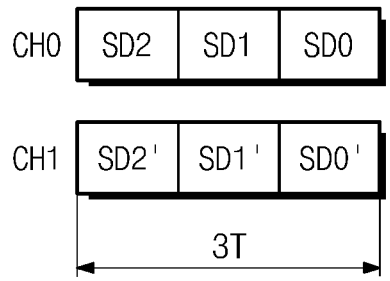
FIGS. 5A through 5C are diagrams illustrating a method of transmitting a data division result of the data division unit in FIG. 2.
Figure 5B:
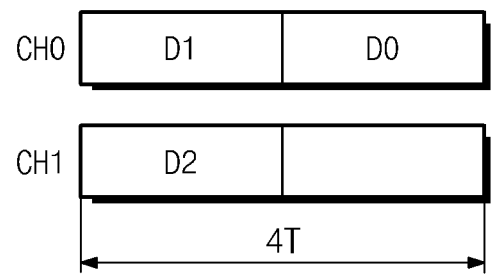
Figure 5C:
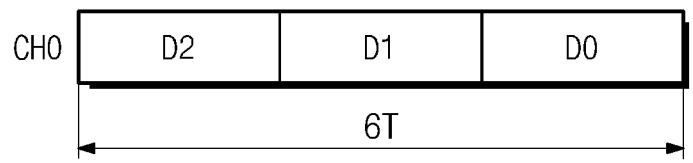

FIGS. 5A through 5C illustrate methods of transmitting data through channels CH0 and CH1. In particular, FIG. 5A illustrates a method in which the data is divided by data division unit 50 and FIGS. 5B and 5C illustrate a method in which data is not divided by data division unit 50.

Referring to FIG. 5A, sub-data SD0, SD0', SD1, SD1', SD2 and SD2' produced by data division unit 50 are simultaneously provided to corresponding channels CH0 and CH1 under the control of DMA control unit 160 without passing through CPU bus 120. To illustrate the transmission time for this operation, where each unit of sub-data comprises one half page and the number of channels is two, the time required to transmit one unit of sub-data may be defined as 1T. Using the method of FIG. 5A, three pages of data D0, D1 and D2 can be transmitted in time 3T.

FIG. 5B illustrates a method in which data is transmitted through channels CH0 and CH1 in entire pages or sectors without data division. FIG. 5C illustrates a method in which entire pages or sectors are transmitted through a single channel without data division. In the methods of FIGS. 5B and 5C, the time required to transmit the three pages or sectors of data is 4T and 6T, respectively, which is longer than the time required to transmit three pages or sectors in the method of FIG. 5A.

Additionally, in the method of FIG. 5B, where an odd number of pages (3 in this case) are transmitted through an even number of channels (2 in this case), DMA control unit 160 may be required to change its operating mode. In particular, DMA control unit 160 may first perform a single channel DMA operation to transmit data D0 through first channel CH0, and then perform a two-channel DMA operation to transmit data D1 and D2 through first and second channels CH0 and CH1. By contrast, because the data in FIG. 5A is divided into units based on the number of channels, there is no need to change the mode of DMA control unit 160. As a result, the method of FIG. 5A may require more simple firmware and hardware structures compared with the method of FIGS. 5B and 5C, which may decrease the development cost and fabrication cost of SSD 500.

The above data transmission times may vary according to the number of simultaneously-accessible channels and the number of units into which each page of data is divided. For example, as the number of simultaneous-accessible channels increases, the time required for data transmission may be shortened. Accordingly, as the number of channels increases, the data transmission efficiency of SSD 500 further increases.

FIG. 6 is a flow chart illustrating a method of storing data in SSD 500 according to an embodiment of the inventive concept. In the description that follows, example method steps are denoted in some instances by parentheses (SXXX) to distinguish them from example device or system elements.

Referring to FIG. 6, controller 100 receives a store command and a unit of data from host 900 (S1100). The received data constitutes main data to be programmed to flash memories 310 through 330, and it may be supplied in a unit such as a page or sector. The main data is stored in buffer memory 150 via host interface 130 and buffer control unit 140. The main data stored in buffer memory 150 is then provided to DMA control unit 160 via buffer control unit 140. In response to DMA control unit 160 receiving the main data, ECC engine 170 generates ECC parity information corresponding to the main data. The ECC parity information is generated through at least one ECC engine 170 shared by a plurality of channels.

The output port of ECC engine 170 is divided by the number of channels in SSD 500 via data division unit 50 of DMA control unit 160. The main data and corresponding ECC parity information is divided by the number of channels (S1200). The resulting sub-data is distributed to and stored in flash memories 310 through 330 via flash interface 180 and a plurality of channels (S1300).

The ECC parity information distributed to and stored in flash memories 310 through 330 may be used to detect and correct errors in the divided main data in a reading operation of flash memories 310 through 330. An error detecting and correcting operation that is performed in the reading operation for the divided main data may be performed through at least one ECC engine 170 shared by a plurality of channels.

Figure 7:
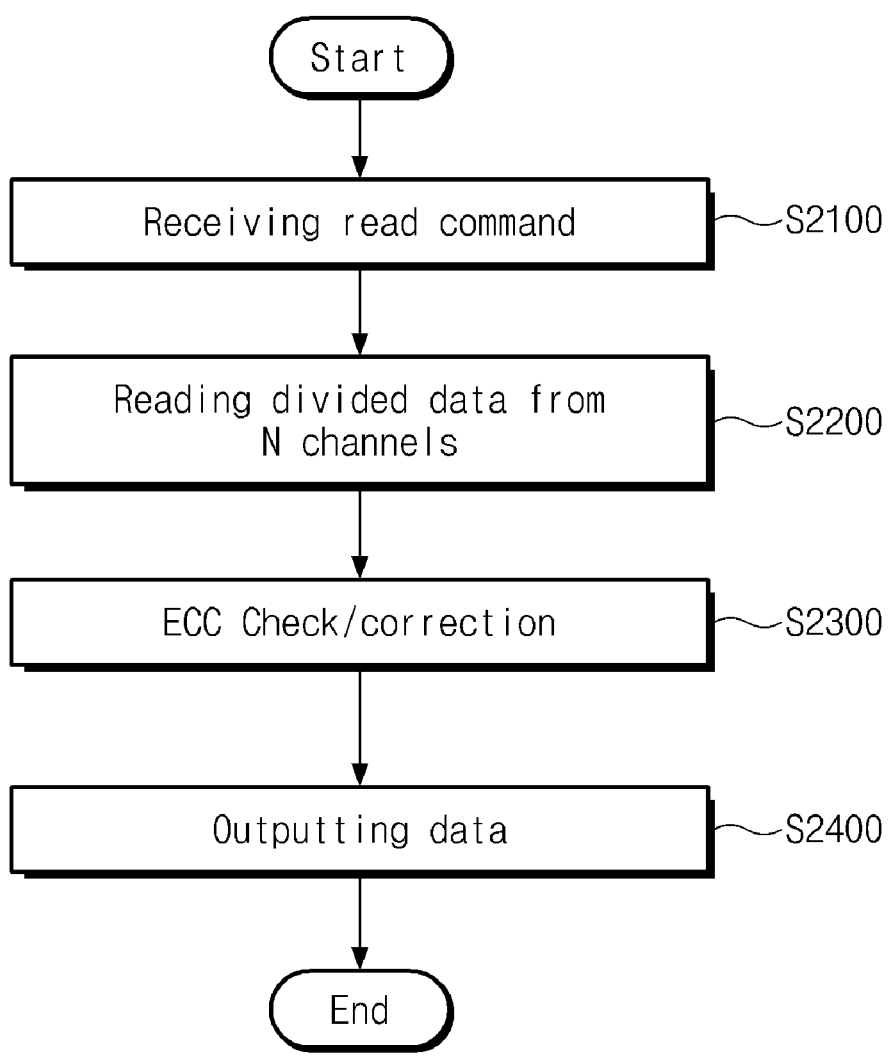
FIG. 7 is a flowchart illustrating a data reading method for a solid state disk device according to an embodiment of the inventive concept.

FIG. 7 is a flow chart illustrating method of reading data in SSD 500 according to an embodiment of the inventive concept.

Referring to FIG. 7, controller 100 receives a read command from host 900 (S2100). Controller 100 reads a plurality of sub-data that have been distributed to and stored in flash memories 310 through 330 via a plurality of channels, in response to a read command (S2200). The data read in operation S2200 comprises sub-data divided from a page or sector by a division operation of data division unit 50 and then transmitted to flash memories 310 through 330. For instance, the sub-data may comprise "N" units of sub-data produced from a page and then transmitted via "N" channels to flash memories 310 through 330.

The data read in operation S2200 is provided to DMA control unit 160 via flash interface 180. The data is temporarily stored in buffer memory 150 or a FIFO memory (not shown) connected to DMA control unit 160. Subsequently, an ECC error detecting and correcting operation is performed through ECC engine 170 that is connected to DMA control unit 160 (S2300). In operation S2300, ECC engine 170 generates ECC parity information corresponding to the main data of a page unit or a sector unit that are read in operation S2200.

SSD 500 compares the generated ECC parity information with the ECC parity information that is read in operation S2200 to determine whether there is an error in the read main data. SSD 500 then corrects any detected errors using the ECC parity information. After detected errors have been detected and corrected in operation S2300, the ECC correction result is output from SSD 500 as a read result via host interface 130 (S2400).

As described above, SSD 500 generates ECC parity information corresponding to main data received in page units or sector units through at least one ECC engine 170 shared by a plurality of channels. The main data and the ECC parity information are divided into a number of units corresponding to the number of channels in SSD 500 and the divided data is simultaneously transmitted to a plurality of flash memories via the plurality of channels.

In a reading operation, SSD 500 reads, via a plurality of channels, a plurality of units of stored data corresponding to a page or sector of main data and ECC parity information. SSD 500 detects and corrects ECC errors through at least one ECC engine 170 shared by a plurality of channels.

According to the methods of FIGS. 6 and 7, SSD 500 may distribute and store data via a plurality of channels without requiring an ECC engine for each of the plurality of channels. As a result, the circuit configuration of SSD 500 may be simplified and data transmission efficiency through a plurality of channels may improve. Although the above embodiments describe ECC engine 170 performing an ECC error detecting and correcting operation for main data comprising a page or sector of data, the unit of data used for ECC error detection and correction may be modified.

Figure 8:
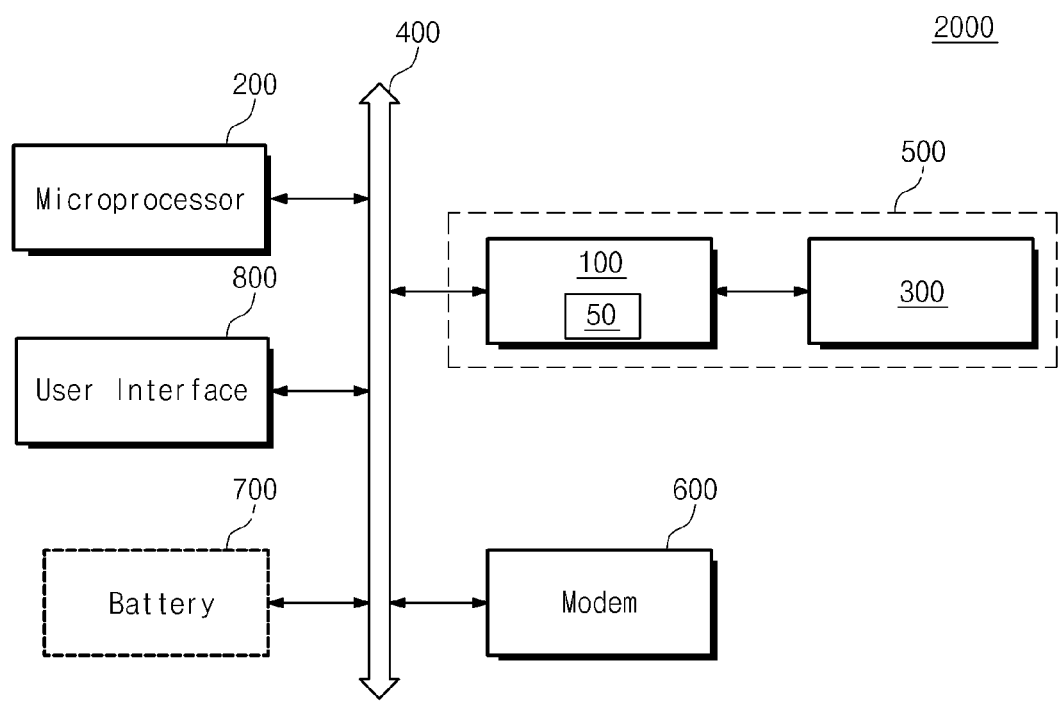
FIG. 8 is a block diagram illustrating a computing system according to an embodiment of the inventive concept.

FIG. 8 is a block diagram illustrating a computing system according to an embodiment of the inventive concept.

Referring to FIG. 8, a computing system 2000 according to an embodiment of the inventive concept comprises controller 100, a microprocessor 200, data storage unit 300, a modem 600 such as a baseband chipset, and a user interface 800 that are electrically connected to a bus 400.

Controller 100 and data storage unit 300 may be incorporated in SSD 500 as in FIGS. 1 and 2, or they may be formed in a memory card or other memory device. The configuration of controller 100 and data storage unit 300 in FIG. 8 is substantially the same as the above-described configuration, and therefore a further description thereof will be omitted to avoid redundancy.

N-bit data (where N is an integer of one or more) that have been processed or will be processed by microprocessor 200 are stored in data storage unit 300. Data storage unit 300 is configured as a nonvolatile memory, such as a flash memory, with a plurality of channels and a plurality of ways. Data storage unit 300 could be implemented with other kinds of volatile or nonvolatile memory devices in other embodiments of the inventive concept.

Controller 100 controls the reading, storing and erasing operations of data storage unit 300. In the storing operations, controller 100 generates ECC parity information for a page or sector of main data using at least one ECC engine shared by a plurality of channels. Then, controller 100 divides the main data and the ECC parity information corresponding to the main data into a number of units corresponding to the number of channels. The divided main data and ECC parity information is distributed to and stored in a plurality of flash memories via the plurality of channels. The ECC parity information, which is distributed to and stored in the flash memories, is used to detect and correct an errors when the data is read. The error detecting and correcting operation is performed through at least one ECC circuit shared by a plurality of channels.

Accordingly, controller 100 distributes and stores data through a plurality of channels without independently including additional circuits such as ECC engines for each of the plurality of channels, and can effectively detect and correct the errors in stored data.

In some embodiments, controller 100 comprises one DMA control unit and one ECC engine. In other embodiments, different numbers of DMA control units and ECC engines can be included in controller 100. Moreover, the physical position and configuration of data division unit 50 can be modified from those illustrated above. In addition, the unit of input data and the unit of data division can be variously changed.

An FTL in controller 100 manages the mapping of divided information in data storage unit 300. A mapping result obtained by the FTL is stored as metadata.

Where computing system 2000 is a mobile device, a battery 700 may be provided to supply power. Although not shown in FIG. 8, computing system 2000 may further comprise an application chipset, a Camera Image Processor (CIP), a mobile DRAM, or other components. Data storage units using heterogeneous nonvolatile memories are now commonly mounted on notebook computers, desktop computers and servers. Computing system 2000 may improve the performance of such systems by addressing current limitations.

According to selected embodiments of the inventive concept, a solid state disk device can distribute and store data via a plurality of channels without including an additional circuit such as an ECC engine for each channel. Accordingly, the configuration of the solid state disk device can be simplified and data transmission efficiency through the plurality of channels can be improved.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. Device storage device using nonvolatile memories, comprising:
   N nonvolatile memories electrically connected to N channels, respectively, where N is a number greater than one; and
   a controller that controls storing, erasing and reading operations of the N nonvolatile memories,
   wherein the controller receives a unit of input data and divides the unit of input data into N data sub-units and stores the N data sub-units in the N nonvolatile memories, respectively, via the corresponding N channels, and
   wherein the controller comprises:
   an error correction engine that generates parity information corresponding to the unit of input data; and
   a direct memory access (DMA) control unit that divides the unit of input data into N sub-units, divides the parity information into N parity sub-units, and transmits the N parity sub-units to the N nonvolatile memories, respectively, via the N channels.

2. The storage device of claim 1, wherein the error correction engine is shared by the N channels.

3. The storage device of claim 1, wherein the error correction engine generates the parity information before the DMA divides the unit of input data into the N data sub-units.

4. The storage device of claim 1, wherein the DMA control unit comprises a data division unit that divides the unit of input data and the parity information into the N data sub-units and N parity sub-units.

5. The storage device of claim 1, wherein the controller further comprises a central processing unit (CPU) connected to the DMA controller via a CPU bus.

6. The storage device of claim 5, wherein the DMA control unit simultaneously transmits the N data sub-units and N parity sub-units to the N nonvolatile memories via the N channels such that the data sub-units and parity sub-units do not pass through the CPU bus.

7. The storage device of claim 1, wherein the unit of input data is a unit for generating the parity information of error correction engine.

8. The storage device of claim 1, wherein a data size of the unit of input data is the same as a data size of a page of each nonvolatile memory.

9. The storage device of claim 1, wherein the DMA control unit comprises a demultiplexer that performs data division operations.

10. The storage device of claim 1, wherein the controller further comprises a flash translation layer that maintains a mapping between physical addresses of the input data stored in the nonvolatile memories and logical addresses of the input data from a host.

11. The storage device of claim 10, wherein the controller further comprises a host interface configured to connect the host to the controller, and the host interface is one of PCI, SATA and SCSI interfaces.

12. A method of storing data in a solid state disk device, comprising:
   receiving a store command and a unit of input data from a host;
   generating parity information using an error correction engine, the parity information corresponding to the unit of input data;
   dividing the input data into N data sub-units and the parity information into N parity sub-units, wherein N is a number greater than one;
   transmitting via N respective channels the N data sub-units and the N parity sub-units to a respective plurality of nonvolatile memories in the solid state disk device; and
   storing the N data sub-units and N parity sub-units transmitted via the N respective channels in the respective plurality of nonvolatile memories.

13. The data storing method of claim 12, wherein the parity information is generated by an error correction engine shared by at least two of the channels.

14. The data storing method of claim 12, wherein the transmitting the N data sub-units and N parity sub-units to the respective plurality of nonvolatile memories via the N respective channels does not pass through a bus of a central processing unit (CPU).

15. The data storing method of claim 12, wherein dividing the input data and the parity information comprises performing a demultiplexing operation.

16. A method of reading data in a solid state disk device, comprising:
   receiving a read command from a host;
   in response to the read command, reading a plurality of data sub-units and a plurality of corresponding parity sub-units stored in a respective plurality of nonvolatile memory devices in the solid state disk device via a respective plurality of channels, wherein the number of the plurality data sub-units and the number of the plurality of parity sub-units equals the number of channels;

generating parity information from the plurality of data sub-units;

comparing the generated parity information with the plurality of parity sub-units to determine whether the data sub-units contain any errors;

correcting any errors detected in the data sub-units through the comparison and outputting the resulting corrected data.

17. The data reading method of claim 16, wherein the generating, comparing, and correcting are performed by an error correction engine shared by two or more channels.

18. The data reading method of claim 16, wherein the nonvolatile memory devices comprise multi-bit flash memory devices.

19. The data reading method of claim 16, further comprising assembling the plurality of data sub-units into a page of data prior to outputting the corrected data.

20. The data reading method of claim 16, further comprising:

prior to outputting the corrected data, mapping logical addresses of the corrected data to physical addresses of the corrected data.

* * * * *